C. T. DRAKE.
LOCK NUT.
APPLICATION FILED MAR. 1, 1910.
986,446.
Patented Mar. 14, 1911.
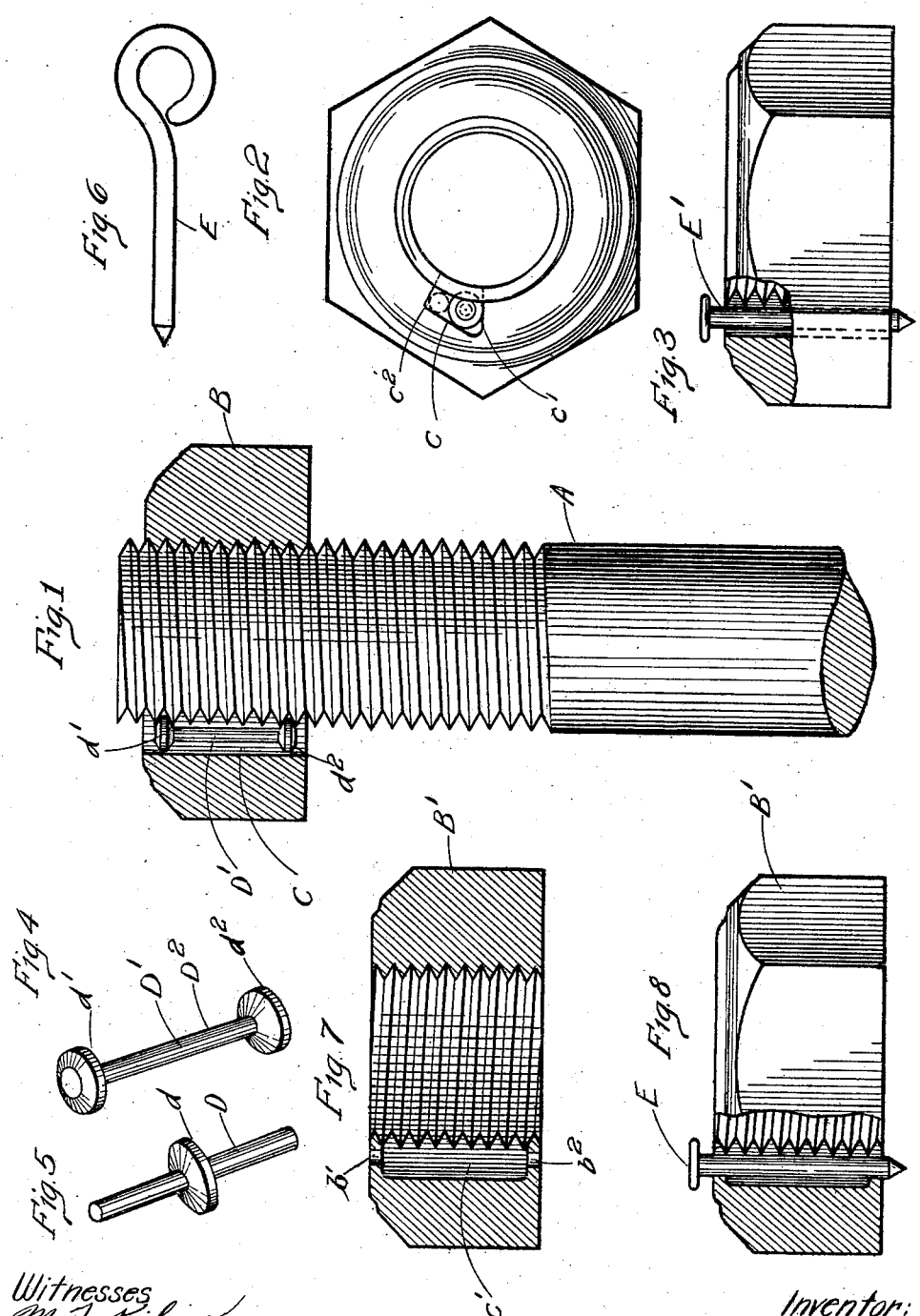

UNITED STATES PATENT OFFICE.

CHESTER T. DRAKE, OF CHICAGO, ILLINOIS, ASSIGNOR TO AMERICAN LOCK NUT COMPANY, OF CHICAGO, ILLINOIS, A CORPORATION OF ILLINOIS.

LOCK-NUT.

986,446.  Specification of Letters Patent.  Patented Mar. 14, 1911.

Application filed March 1, 1910. Serial No. 546,596.

*To all whom it may concern:*

Be it known that I, CHESTER T. DRAKE, a citizen of the United States, residing at Chicago, in the county of Cook and State of Illinois, have invented certain new and useful Improvements in Lock-Nuts, of which the following is a specification.

My invention relates in general to lock nuts, and more particularly to a lock nut of the type having therein a key adapted to be wedged between the nut and bolt upon any relative movement between the nut and bolt in a direction to remove the nut from the bolt.

The object of my invention is to provide an improved lock nut which will be simple in construction, inexpensive in manufacture, and efficient in use.

My invention, generally described, consists of a nut having an axial recess in the inner surface thereof of a wedge-shaped cross section, within which is located a movable key consisting of one or more disks mounted upon a rod, and thereby retained in such a position relatively to the thread of the bolt that any tendency to relatively rotate the nut and bolt in a direction to remove the nut will move the locking disk toward the restricted portion of the recess, and thereby wedge the same tightly against the thread of the bolt.

My invention will be more fully described hereinafter with reference to the acompanying drawing, in which the same is illustrated as embodied in two convenient and practical forms, and in which—

Figure 1 is an elevational view of the screw-threaded end of a bolt having thereon my improved lock nut, the latter being shown in section; Fig. 2, a plan view of the bolt with the lock nut thereon; Fig. 3, a side elevational view, part being broken away, of the nut, showing the releasing pin in position therein. Fig. 4, a perspective view of one form of the locking key. Fig. 5, a perspective view of a modified form of locking key; Fig. 6, a plan view of a releasing pin; Fig. 7, a vertical section of a modified form of my improved lock nut; and Fig. 8, a side elevational view, part being in section, of the modified form of nut shown in Fig. 7 with a releasing pin in position therein.

Similar reference characters are used to designate similar parts in the several figures of the drawing.

Reference letter A indicates the screw threaded end portion of a bolt or bar.

B indicates the nut, which is shown hexagonal in form, but it obviously may be of any other shape or form. A recess C is formed in the nut opening into the center thereof. The recess C extends axially within the nut and is of wedge-shaped cross section, thereby forming an enlarged portion $c'$ and a restricted portion $c^2$.

D' indicates one form of my improved locking key, which comprises two disks $d'$ and $d^2$ mounted upon a rod $D^2$, the latter serving to support the locking disks within the recess C in the nut B in such positions that their peripheries will be presented toward the thread of the bolt.

My improved locking key may also find embodiment in other specific structures than that illustrated in Fig. 4, such for instance as that shown in Fig. 5, in which a single disk $d$ is mounted upon a rod D, the latter serving to facilitate the introduction of the locking disk into the proper position in the recess C in the nut B, and to retain the locking disk in such a position that its periphery will be presented toward the thread on the bolt. The locking key need have, however, a very slight movement toward the restricted portion of the recess C, in view of the fact that it is only provided with one disk or with two disks widely spaced apart, thereby permitting the locking device to cant or asume a position inclined to the axis of the bolt. Consequently the nut is locked immediately upon cessation of its rotation on the bolt without necessitating any appreciable retrograde movement of the nut on the bolt.

The manner of using my improved lock nut will be readily understood from the foregoing description, and is briefly as follows: The locking key is placed within the recess in the nut and the nut screwed upon the end of the bolt. The relative rotation of the nut and bolt in a direction to apply the nut to the bolt retains the locking key, through the engagement of the bolt thread with the disks on the locking key, in the larger portion $c'$ of the recess C, the size of the larger portion of the recess relatively to the size of the locking disks being such as to permit the free relative rotation of the nut and bolt in a direction to apply the nut to the bolt, Any tendency of the nut and bolt to relatively rotate in a direction to disconnect the nut from the bolt will, through the engagement of the thread on the bolt with the disks on the locking key, move the latter into the restricted portions $c^2$ of the recess C, thereby tightly wedging the disks on the locking key against the thread of the bolt, as clearly shown in Fig. 1.

In order to remove the nut from the bolt, an unlocking pin, such as shown at E in Fig. 6, or E′ in Fig. 3, is inserted between the wall of the recess at the restricted end thereof and the locking key, thereby moving the latter into the enlarged portion of the recess where it is retained by the unlocking pin during the rotation of the nut from its engagement with the bolt.

When the form of my improved locking key shown in Fig. 5 is used, the operation is the same as that above described in connection with the improved form of locking key shown in Fig. 4. In each of these embodiments of my invention, the rod upon which the locking disk or disks are supported serves as a convenient means of inserting the locking disk into proper relation between the nut and bolt, and also to insure the locking disk or disks being in such positions in the recess in the nut as to present the periphery, or peripheries thereof, to the thread of the bolt.

If desired, the recess in the nut may have overlying flanges to prevent the axial movement of the locking key within the recess during the application of the nut to the bolt. In Figs. 7 and 8, I have illustrated such modified form of nut in which B′ indicates the nut, C′ the recess therein to receive the locking key, and $b'$, $b^2$ flanges overlying the ends of the recess.

The flanges which overlie the recess are provided with openings alining with the restricted portion of the recess through which the unlocking pin E′ may be inserted to retain the locking key in the enlarged portion of the recess during the disengagement of the nut from the bolt.

From the foregoing description, it will be observed that I have invented an improved lock nut, which may be conveniently applied to a bolt, and which, though simple in construction, will effectively prevent the disengagement of the nut from the bolt, but which when desired may be easily removed from the bolt.

I claim:

1. The combination with a nut adapted to engage the thread of a bolt and having an axial recess therein comprising enlarged and contracted portions, of a locking device located within said recess comprising a disk of less radius than the depth of the groove between adjacent convolutions of the thread of the bolt and having diverging circular faces engaging the inclined surfaces between two adjacent convolutions of the thread of the bolt when wedged into the contracted portion of said recess, and a rod on which said disk is integrally formed for locating said disk in position in the nut, the thickness of said rod being sufficiently less than the diameter of said disk, and the angle of divergence of the faces of said disk being so related to the angle of divergence of the inclined surfaces between adjacent convolutions of the thread of the bolt that the rod overlies without engaging the thread of the bolt.

2. The combination with a bolt, of a nut adapted to engage the thread of the bolt, said nut having an axial recess therein comprising enlarged and contracted portions, a locking device located within said recess comprising two disks, each of said disks being of less radius than the depth of the groove between adjacent convolutions of the thread of the bolt and having diverging circular faces engaging the inclined surfaces between two adjacent convolutions of the thread of the bolt when wedged into the contracted portion of said recess, and a rod at the ends of which said disks are integrally formed, the thickness of said rod intermediate of said disks being sufficiently less than the diameter of the disks, and the angle of divergence of the faces of said disks being so related to the angle of divergence of the inclined surfaces between adjacent convolutions of the bolt thread that the rod overlies without engaging the thread of the bolt between the disks.

In testimony whereof, I have subscribed my name.

CHESTER T. DRAKE.

Witnesses:
 EDYTHE M. ANDERSON,
 ANNA L. WALTON.